Patented June 3, 1941

2,244,340

UNITED STATES PATENT OFFICE 2,244,340

DISAZO DYES

Swanie S. Rossander, Wilmington, Del., and Donovan E. Kvalnes, Penns Grove, N. J., assignors to E. I. du Pont de Nemours & Company, Wilmington, Del., a corporation of Delaware No Drawing. Application November 22, 1939, Serial No. 305,658

6 Claims. (Cl. 260—186)

This invention relates to disazo dyes which are devoid of sulfonic acid and carboxyl groups and which contain at least one polyhydroxyalkyl group connected to an amino nitrogen.

Heretofore attempts have been made to dye cellulose acetate fibers with disazo dyes which are devoid of sulfonic acid and carboxyl groups. Such dyes are in general so insoluble in water, so difficult to disperse and they have so little affinity for the fiber that cellulose acetate fibers cannot be satisfactorily dyed with them. Disazo dyes which are capable of satisfactorily dyeing cellulose acetate fibers are desired in order to provide a greater range of shades and other desirable characteristics which are not provided by monazo dyes.

It is among the objects of the present invention to provide disazo dyes which are devoid of sulfonic acid and carboxyl groups and which have good affinity for various fibers, especially for cellulose acetate fibers, and have other technically valuable characteristics. Another object of the invention is to provide such dyes which contain at least one polyhydroxyalkyl group.

Another object of the invention is to provide disazo dyes which have good affinity for cellulose acetate and which have other properties that are necessary for making dye baths of practicable technical value. Still other objects of the invention will be apparent from the following description.

The objects of the invention are attained in general by effecting coupling of suitable compounds which are devoid of sulfonic acid and carboxyl groups, either in a stepwise or single coupling reaction, and selecting the compounds which are coupled so that at least one component of the product of coupling will contain a polyhydroxy radical connected to an amino nitrogen, the polyhydroxy radical being of the kind which has 4 to 6 carbons and one less hydroxy than carbons of the monosaccharide aldose series. Dyeings are made from aqueous solutions of the disazo compounds but some of the disazo dyestuff may be present as a dispersion.

The invention will be more fully set forth in the following more detailed description which includes examples that are given as illustrative embodiments of the invention and not as limitations thereof. Parts are expressed in parts by weight.

Example 1

Three hundred and fourteen parts of the compound obtained by coupling diazotized para-nitro-aniline to hydroxy-ethyl, ethyl-aniline and reducing the nitro group by heating with sodium sulfide, were dissolved in 1000 parts of water and 300 parts of 31.5% hydrochloric acid, cooled with ice to 0° C. and diazotized by the addition of a water solution containing 69 parts of sodium nitrite. The diazo solution was then added to a solution of 315 parts of methyl, sorbityl cresidine dissolved in 2000 parts of water and 100 parts of 31.5% hydrochloric acid. Mineral acidity was destroyed by the slow addition of sodium acetate solution and coupling was carried out at about 10° C. The product of coupling was isolated from a slightly alkaline medium. It had good affinity for cellulose acetate and dyed cellulose acetate fibers from water solutions a bright red shade.

The dye is represented by the formula

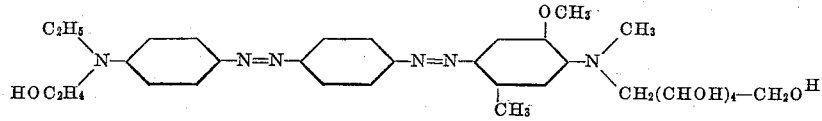

Methyl, sorbityl cresidine was obtained by condensing cresidine with glucose, catalytically reducing and methylating the sorbityl-cresidine with dimethyl-sulfate.

Example 2

Three hundred and seven parts of the compound obtained by coupling diazotized alpha-naphthylamine to 2,5-dimethoxy-aniline, were diazotized in the same manner as described in Example 1 and added to a solution made by dissolving 223 parts of N-sorbityl-1,5-amino-naphthol in 2000 parts of water and 100 parts of 31.5% hydrochloric acid. The mineral acidity was slowly destroyed by the addition of sodium acetate solution. The coupling was made at about 5° C.–10° C. and the product of coupling was finally isolated from a neutral medium. The product of coupling was soluble in water and dyeings were made on acetate silk from such solutions but more satisfactory dye baths were made by dispersing an excess of the compound in the solution. Satisfactory dyeings were made on cellulose acetate fiber. They were a bright blue shade.

The dyestuff is represented by the formula

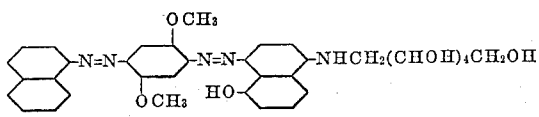

N-sorbityl-1,5-amino-naphthol may be prepared by catalytically reducing the condensation product of 1,5-amino-naphthol and glucose.

The following are further illustrations of the invention. The properties are similar to those of the foregoing examples except where differences are noted.

| Example | Combination | Shade |
|---|---|---|
| 3 | Ortho-chlor-aniline → ortho-toluidine → methyl, sorbityl-aniline | Scarlet. |
| 4 | Ortho-chlor-aniline → ortho-toluidine → sorbityl-cresidine | Red. |
| 5 | Ortho-chlor-aniline → ortho-toluidine → methyl, sorbityl-cresidine | Bluish red. |
| 6 | Para-nitro-aniline → meta-toluidine → sorbityl-meta-toluidine | Red brown. |
| 7 | Ortho-chlor-aniline → 2,5-dimethoxy-aniline → N-sorbityl-1,5-amino-naphthol | Greenish blue. |
| 8 | Para-phenetidine → 2,5-dimethoxy-aniline → N-sorbityl-1,5-amino-naphthol | Bluish green. |
| 9 | Para-amino-acetanilide → 2,5-dimethoxy-aniline → N-sorbityl-1,5-amino-naphthol | Greenish blue. |
| 10 | Dianisidine ==> 2[(N-sorbityl-1,5-amino-naphthol)] | Reddish blue. |
| 11 | N(para-amino-benzoyl) glucamine → 2,5-dimethoxy-aniline → phenol | Reddish orange. |
| 12 | Para-amino-sorbityl-aniline → resorcin ← para-nitro-aniline | Tan. |
| 13 | Para-amino-sorbityl-aniline → meta-phenylene-diamine ← N(para-amino-benzoyl) glucamine. | Reddish brown. |
| 14 | N(para-amino-benzoyl) glucamine → N-sorbityl-meta-phenylene-diamine ← picramic-acid. | Tan. |
| 15 | 2[N(para-amino-benzoyl) glucamine] → resorcin | Do. |
| 16 | 2[(para-nitro-aniline)] → 1,6-dianilido-mannitol | Orange. |
| 17 | 4,4'-diamino-stilbene → 2[(methyl, sorbityl-aniline)] | Yellow. |
| 18 | Para-amino-benzyl-trimethyl-ammonium-bromide → meta-toluidine → methyl, sorbityl-aniline. | Brown orange. |
| 19 | 4,4'-diamino-diphenyl-amine → 2[N-sorbityl-1,5-amino-naphthol] | Violet. |
| 20 | Benzidine → (phenyl-glucamine)₂ | Yellow. |
| 21 | Dianisidine → (phenyl-glucamine)₂ | Do. |
| 22 | Benzidine → (methyl-sorbityl-aniline)₂ | Do. |

The objects of the invention are attained when any polyhydroxyalkyl radical of the monosaccharide aldose series containing 4 to 6 carbons and one less hydroxy than carbons is contained in at least one of the radicals of the disazo compound and the polyhydroxyalkyl radical is connected to an amino nitrogen. As illustrations of such compounds are the erythrityl

[CH₂(CHOH)₂—CH₂OH]

penta-erythrityl [—CH₂C(CH₂OH)₃], arabityl [—CH₂(CHOH)₃CH₂OH], fructyl

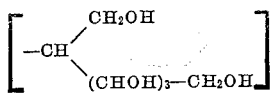

and mannityl [—CH₂(CHOH)₄CH₂OH] derivatives corresponding to the sorbityl and glucamine radicals recited in the foregoing illustrations, as for example methyl-penta-erythrityl-cresidine, methyl-fructyl-cresidine, penta-erythrityl-cresidine, N - arabityl - 1,5 - amino - naphthol, para amino-erythrityl-aniline, 1,6-dianilido-arabitol and the N(para-amino-benzoyl) amine of erythrose.

The couplings can be effected in a variety of ways as will be understood by those skilled in the art depending on the nature of the compounds employed and the position and number of polyhydroxyalkyl groups desired in the disazo product. For example where A, B and C represent the order in which the compounds are coupled, C being the last, a variety of methods can be employed such as A→B→C, A→B←C, B←A→C, and

and the polyhydroxyalkyl group or groups may be present in any one, in any two or in all of the component radicals. However, the secondary disazo compounds as represented by the scheme A→B→C are preferred.

Any diazotizable primary aryl amine which is devoid of sulfonic acid and carboxyl groups can be used as the first component in making the disazo compounds A→B→C of the invention. As illustrations of such primary aryl amines, the following are mentioned: aniline, o-, m- and p-toluidine, o-, m- and p-chlor aniline, 2,5-dichlor aniline, o-, m- and p-nitro amiline, o-, m- and p-anisidine, o-, m- and p-phenetidine, o-chlor-p-nitro-aniline, 4- and 5-nitro-2-amino-anisol, m- and p-amino-acetanilide, p-amino-sorbityl-aniline, alpha and beta naphthylamine, 2,5-dimethoxy aniline, p-chlor-o-toluidine, the xylidines, cresidine, p-amino benzyl trimethyl ammonium bromide, N(p-amino benzoyl) glucamine, N(p-amino benzoyl) methyl glucamine, N(m- and p-amino benzyl) methyl glucamine, N(m- and p-amino benzene sulfonyl) glucamine and p-amino sorbityl aniline.

As illustrations of the B component, the following are mentioned: aniline, o- and m-toluidine, o- and m-anisidine, o- and m-phenetidine, p-xylidine, cresidine, 2,5-dimethoxy-aniline, 2-methoxy-5-acetyl amino aniline, alpha and beta naphthylamine, m-amino acetanilide and N(m-amino-benzyl) methyl glucamine.

As the C component in such a disazo dye the following are mentioned as illustrative: aniline, o- and m-toluidine, o- and m-anisidine, o- and m-phenetidine, p-xylidine, 2,5-dimethoxy aniline, 2-methoxy-5-acetylamino aniline, m-amino acetanilide, alpha and beta naphthylamine, cresidine and 1,5-amino naphthol. All of the above products and their secondary and tertiary amines wherein the N-groups are alkyl, hydroxyalkyl and polyhydroxyalkl containing 4 to 6 carbons and one less hydroxy than carbons, such as methyl, sorbitylaniline, sorbityl alpha naphthylamine, hydroxy ethyl, sorbityl m-toluidine, di(hydroxy ethyl) aniline, ethyl hydroxy ethyl aniline, and others such as resorcin, m-phenylene diamine, diphenylamine and N-sorbityl m-phenylene diamine can be used.

In compounds

the C components of the foregoing compounds A→B→C are suitable. Suitable A compounds are those having two primary amine groups such as benzidine, dianisidine, toluidine m- and p-phenylene diamine (made by an indirect method of coupling), 4,4'-diamino stilbene, 4,4'-diamino diphenylamine and 4,4'-diamino diphenyl sulfone, 4,4'-diamino benzophenone, thioaniline, 4,4'-diamino diphenyl ether, 4,4'-diamino diphenyl methane.

In making compounds A→B←C the compounds A in the combinations A→B→C are suitable for both A and C. Suitable B components are those such as resorcin, m-phenylene diamine, sorbityl m-phenylene diamine, 1,6-dianilido mannitol [C₆H₅—NH—CH₂(CHOH)₄CH₂—NH—C₆H₅] and other dianilido compounds having a polyhydroxyalkyl bridging group of 4 to 6 carbons and one less hydroxy than carbons.

Combinations such as B←A→C can be made by diazotizing a primary arylamine which is substituted by a nitro or a hydrolyzable acylamino group, coupling to a C compound such as ethyl, hydroxy ethyl aniline, reducing or hydrolyzing the monazo compounds, as the case may be, to produce a primary amino group connected to A, and finally diazotizing and coupling to a coupling component, such as a B or C component of the combination A→B→C. Illustrations of compounds A in B←A→C are those such as p-nitro aniline, oxalyl p-phenylene diamine, formyl m-phenylene diamine. By suitable use of intermediates of the kinds mentioned a great variety of disazo compounds containing at least one of the described polyhydroxyalkyl groups connected to an amino nitrogen can be made.

In general the disazo compounds which contain sulfonic acid and carboxyl are soluble but they lack affinity for cellulose acetate fiber while those which are devoid of such groups and contain other substituents besides the described polyhydroxyalkyl groups are insoluble. Dispersions of most of the latter compounds lack affinity or produce poor dyeings on acetate silk, and those which show any affinity for cellulose acetate fiber when dispersed make dye baths having unsatisfactory characteristics, such as exhaust value. However, the presence of the described polyhydroxyalkyl groups in the disazo compounds which are devoid of sulfo and carboxyl groups gives compounds having satisfactory solubility, dispersibility, affinity and other characteristics necessary for satisfactory and improved dyeings on acetate silk and for satisfactory dye preparation and operation of the dye baths. As far as we are aware, the dyes disclosed are more soluble in water, are more readily dispersed in water solutions of the dyes, are more readily applied to the fiber than any disazo dye heretofore known.

From the foregoing disclosure it will be recognized that the invention is susceptible of modification without departing from the spirit and scope thereof and it is to be understood that the invention is not restricted to the specific illustrations thereof herein set forth.

We claim:
1. A disazo dyestuff represented by the formula

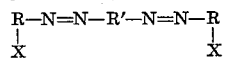

in which each R is one of a group consisting of benzene and naphthalene nuclei; X is from the group consisting of hydrogen, methyl, alkoxy containing 1 to 4 carbons, nitro, halogen, hydroxy, amino, acetylamino, —NH polyhydroxyalkyl,

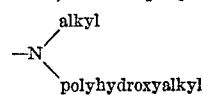

and

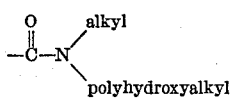

wherein polyhydroxyalkyl has 4 to 6 carbons and one less hydroxy than carbons and the alkyl groups have 1 to 4 carbons; R' is one of a group consisting of the radicals

and

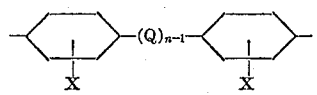

wherein Y is from the group consisting of hydrogen, methyl, alkoxy having 1 to 4 carbons, halogen, hydroxy, amino, acetylamino, —NH-polyhydroxyalkyl,

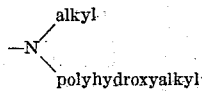

and

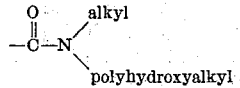

wherein polyhydroxyalkyl is from the monosaccharide aldose series and has 4 to 6 carbons and one less hydroxy than carbons and the alkyl groups have 1 to 4 carbons; n is an integer not greater than 2 and Q is one of the group consisting of —CH=CH—, —NH—, —O—, —S—, —SO₂—, —CO—, —CH₂—, and —NH-polyhydroxyalkyl-NH, said dyestuff having at least one polyhydroxyalkyl amino group, said compound being devoid of a nuclearly substituted tertiary amino group when one R is the nucleus of a naphthol.

2. The secondary disazo dyestuffs represented by the formula

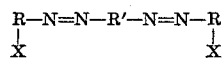

in which each R is one of a group consisting of benzene and naphthalene nuclei, X is from the group consisting of hydrogen, methyl, alkoxy containing 1 to 4 carbons, nitro, halogen, hydroxy, amino, acetylamino, —NH polyhydroxyalkyl,

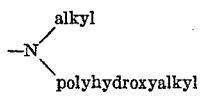

and

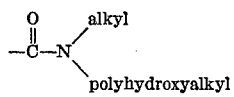

wherein polyhydroxyalkyl has 4 to 6 carbons and one less hydroxy than carbons and the alkyl groups have 1 to 4 carbons; R' is one of a group consisting of the radicals

and

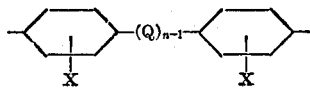

wherein Y is from the group consisting of

HOCH$_2$(CHOH)$_4$CH$_2$—N(H)—CO—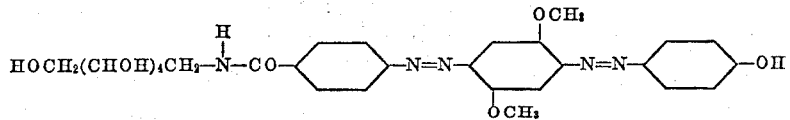

hydrogen, methyl, alkoxy having 1 to 4 carbons, halogen, hydroxy, amino, acetylamino, —NH-polyhydroxyalkyl,

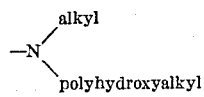

and

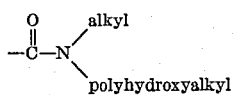

wherein polyhydroxyalkyl is from the monosaccharide aldose series and has 4 to 6 carbons and one less hydroxy than carbons and the alkyl groups have 1 to 4 carbons; $n$ is an integer not greater than 2 and Q is one of the group consisting of —CH=CH—, —NH—, —O—, —S—, —SO$_2$—, —CO—, —CH$_2$—, and —NH-polyhydroxyalkyl-NH, said dyestuff having at least one polyhydroxyalkyl amino group, said compound being devoid of a nuclearly substituted tertiary amino group when one R is the nucleus of a naphthol.

3. The compound represented by the formula

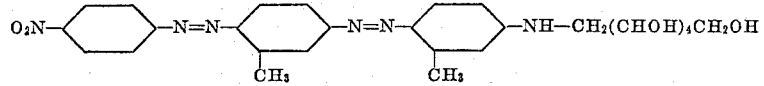

4. The compound represented by the formula

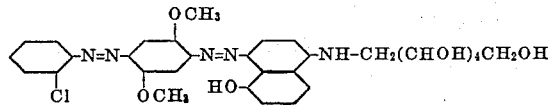

5. The compound represented by the formula

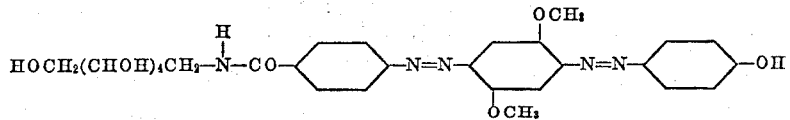

6. The process which comprises diazotizing a primary aryl amine of the benzene series; coupling with a compound of the benzene series containing one of a group consisting of amino and a group capable of being transformed into amino after coupling, and coupling the diazo derivative of said monazo compound with a compound of the benzene series, said compounds being devoid of carboxy and sulfonic acid groups and at least one of said compounds containing one of a group consisting of —NH polyhydroxyalkyl,

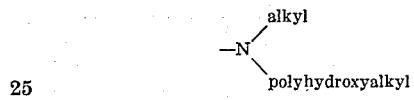

and

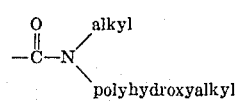

wherein polyhydroxyalkyl has 4 to 6 carbons and one less hydroxy than carbons and alkyl has 1 to 4 carbons.

SWANIE S. ROSSANDER.
DONOVAN E. KVALNES.